US010027716B2

(12) United States Patent
Watson et al.

(10) Patent No.: US 10,027,716 B2
(45) Date of Patent: *Jul. 17, 2018

(54) SYSTEM AND METHOD FOR SUPPORTING WEB SERVICES IN A MULTITENANT APPLICATION SERVER ENVIRONMENT

(71) Applicant: Oracle International Corporation, Redwood Shores, CA (US)

(72) Inventors: Tim Watson, San Ramon, CA (US); Guoyong Zhang, Mount Laurel, NJ (US); Michael Chen, Santa Clara, CA (US); Alan Mullendore, Alameda, CA (US); Arjav Desai, Mount Laurel, NJ (US); Bob Naugle, Mount Laurel, NJ (US); Mike Gilbode, Mount Laurel, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,680

(22) Filed: Sep. 19, 2017

(65) Prior Publication Data

US 2018/0027023 A1 Jan. 25, 2018

Related U.S. Application Data

(63) Continuation of application No. 14/866,591, filed on Sep. 25, 2015, now Pat. No. 9,807,119.

(Continued)

(51) Int. Cl.
*H04L 29/06* (2006.01)
*H04L 29/08* (2006.01)
*H04L 12/24* (2006.01)

(52) U.S. Cl.
CPC .......... *H04L 63/20* (2013.01); *H04L 41/0273* (2013.01); *H04L 41/20* (2013.01); *H04L 67/02* (2013.01); *H04L 67/10* (2013.01)

(58) Field of Classification Search
CPC ......... H04L 63/20; H04L 67/02; H04L 67/10; H04L 41/0273; H04L 41/20
See application file for complete search history.

(56) References Cited

U.S. PATENT DOCUMENTS 8,078,704 B2  12/2011  Lee
8,402,525 B1  3/2013  Shah
(Continued)

*Primary Examiner* — Eleni A Shiferaw
*Assistant Examiner* — Hee K Song
(74) *Attorney, Agent, or Firm* — Tucker Ellis LLP

(57) ABSTRACT

In accordance with an embodiment, described herein is a system and method for supporting web services in a multitenant application server environment. The system includes a domain with a plurality of partitions, wherein each partition can include one or more web services, and a web services inspection language (WSIL) application. A partition-aware managed bean server can include managed beans for generating addresses of web services deployed to each partition, wherein the generated addresses can be retrieved by the WSIL application in that partition for use by clients in accessing the web services. The system can further include a web service security manager that can secure web services in each partition, by attaching security policies to each web service endpoint and enforcing the security policies on requests directed to that web service endpoint.

20 Claims, 8 Drawing Sheets

Related U.S. Application Data

(60) Provisional application No. 62/056,437, filed on Sep. 26, 2014.

(56) References Cited

U.S. PATENT DOCUMENTS

| | | |
|---|---|---|
| 9,807,119 B2 | 10/2017 | Watson |
| 2006/0106748 A1 | 5/2006 | Chafle |
| 2007/0282879 A1 | 12/2007 | Degenkolb |
| 2009/0125612 A1 | 5/2009 | Rabetge |
| 2009/0307743 A1 | 12/2009 | Azagury |
| 2010/0191843 A1 | 7/2010 | Bohm |
| 2011/0145794 A1 | 6/2011 | Gerginov |
| 2014/0244585 A1 | 8/2014 | Sivasubramanian |
| 2016/0094582 A1 | 3/2016 | Watson |

SYSTEM AND METHOD FOR SUPPORTING WEB SERVICES IN A MULTITENANT APPLICATION SERVER ENVIRONMENT

CLAIM OF PRIORITY

This application is a continuation of U.S. patent application Ser. No. 14/866,591, filed Sep. 25, 2015, now U.S. Pat. No. 9,807,119, issued Oct. 31, 2017, titled "SYSTEM AND METHOD FOR SUPPORTING WEB SERVICES IN A MULTITENANT APPLICATION SERVER ENVIRONMENT", which claims the benefit of priority to U.S. Provisional Application No. 62/056,437, filed Sep. 26, 2014 titled "SYSTEM AND METHOD FOR SUPPORTING WEB SERVICES IN A MULTITENANT APPLICATION SERVER ENVIRONMENT"; each of which above applications are herein incorporated by reference in their entirety.

CROSS-REFERENCE TO RELATED APPLICATIONS

This application is related to U.S. Provisional Application No. 61/929,888, filed Jan. 21, 2014 titled "SYSTEM AND METHOD FOR SUPPORTING MULTITENANCY IN AN APPLICATION SERVER, CLOUD, OR OTHER ENVIRONMENT" and U.S. patent application Ser. No. 14/601,883 filed Jan. 21, 2015, now U.S. Pat. No. 9,961,011, issued May 1, 2018, titled "SYSTEM AND METHOD FOR SUPPORTING MULTI-TENANCY IN AN APPLICATION SERVER, CLOUD, OR OTHER ENVIRONMENT"; each of which above applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting web services in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment. In such a cloud environment, web service implementations (for example, JRF, WLS JAX-WS) ideally should continue to be supported, so that applications in the cloud environment can provide and consume the web services.

SUMMARY

In accordance with an embodiment, described herein is a system and method for supporting web services in a multitenant application server environment. The system comprises a domain with a plurality of partitions, wherein each partition can include one or more web services, and a web services inspection language (WSIL) application. A partition-aware managed bean server can include managed beans for generating addresses of web services deployed to each partition, wherein the generated addresses can be retrieved by the WSIL application in that partition for use by clients in accessing the web services. The system can further include a web service security manager that can secure web services in each partition, by attaching security policies to each web service endpoint and enforcing the security policies on requests directed to that web service endpoint.

DETAILED DESCRIPTION

In accordance with an embodiment, described herein is a system and method for supporting web services in a multi-tenant application server environment. The system comprises a domain with a plurality of partitions, wherein each partition can include one or more web services, and a web services inspection language (WSIL) application. A partition-aware managed bean server can include managed beans for generating addresses of web services deployed to each partition, wherein the generated addresses can be retrieved by the WSIL application in that partition for use by clients in accessing the web services. The system can further include a web service security manager that can secure web services in each partition, by attaching security policies to each web service endpoint and enforcing the security policies on requests directed to that web service endpoint.

Application Server (e.g., Multi-Tenant, MT) Environment

Figure 1:
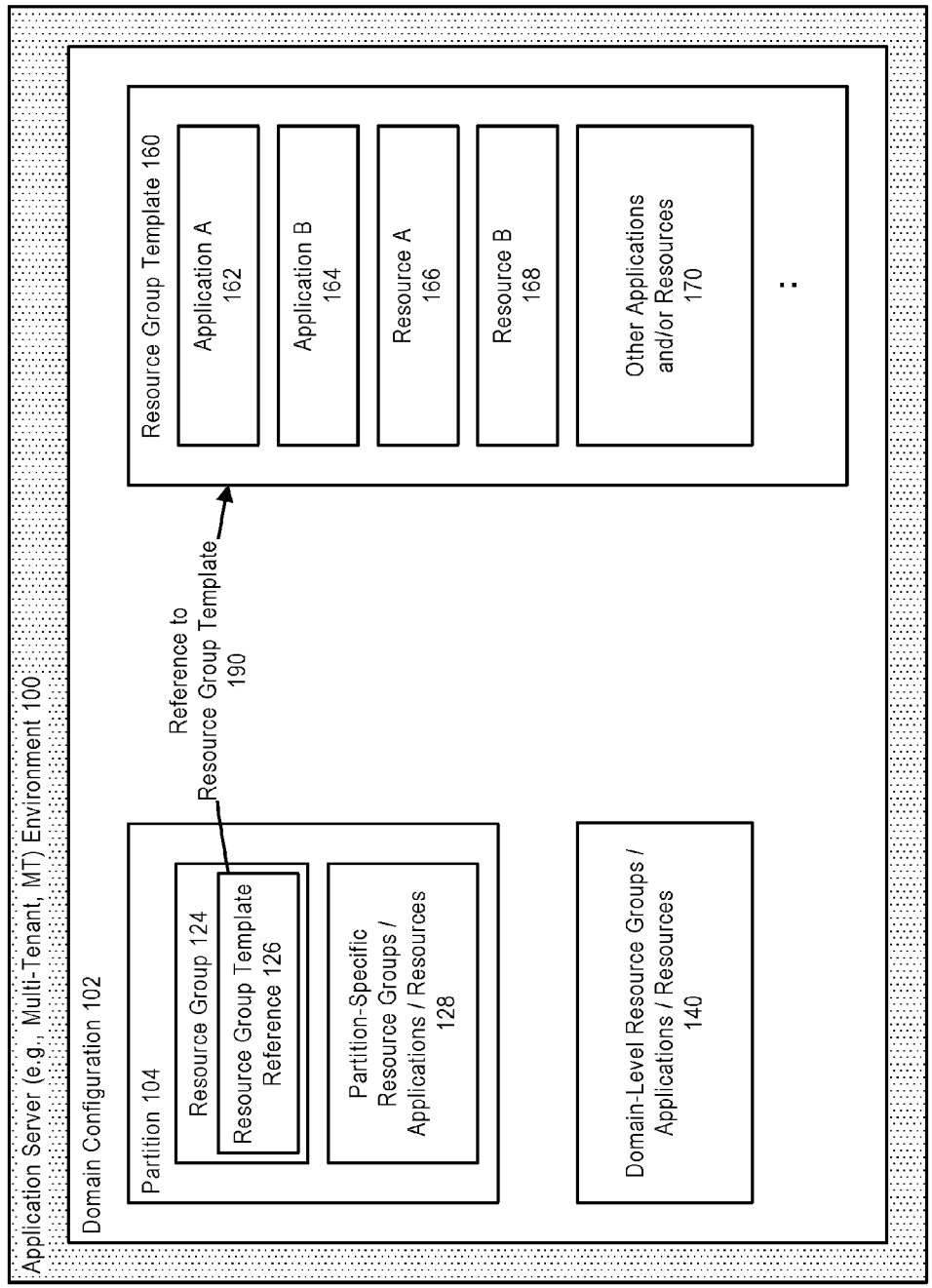
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
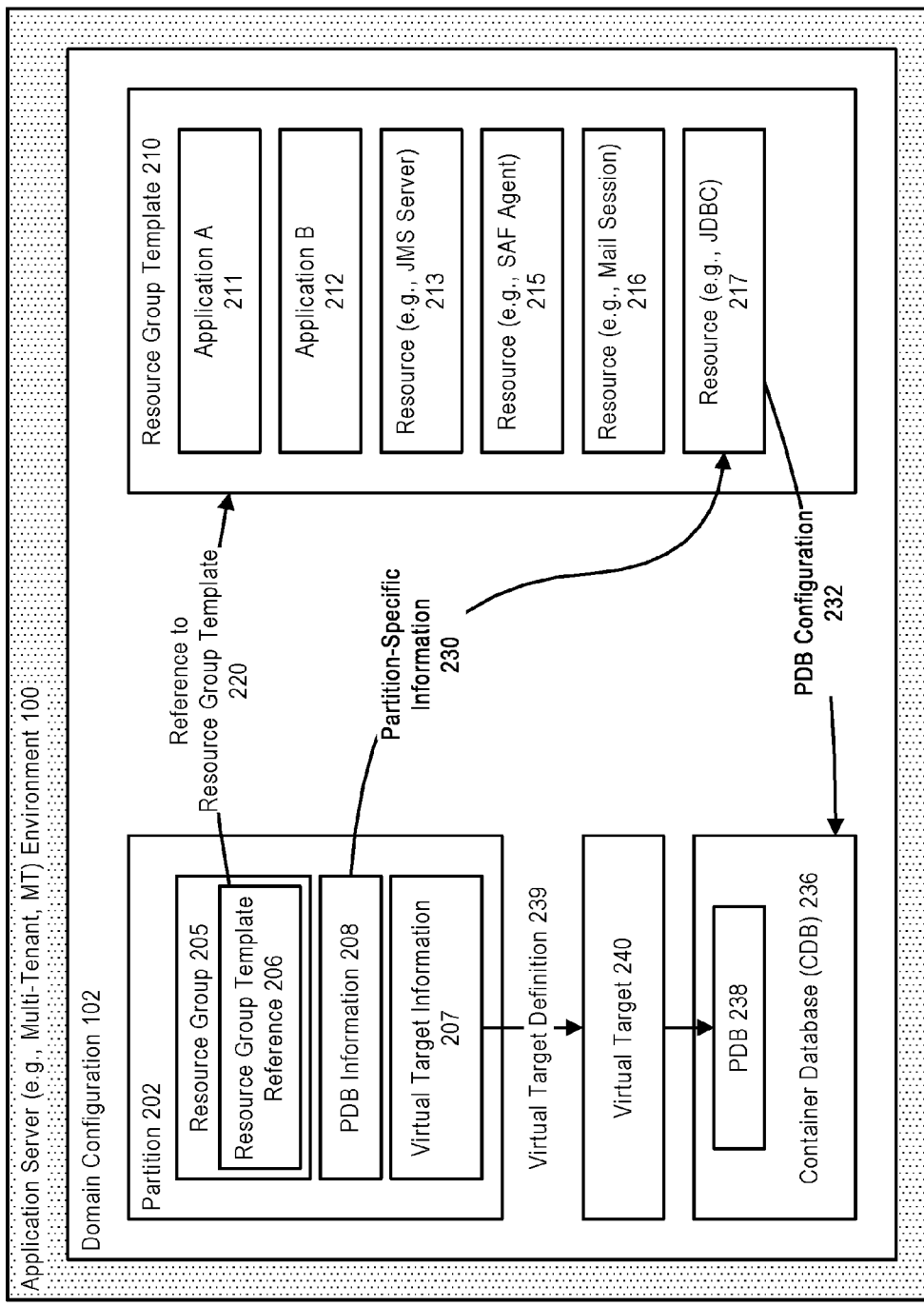
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
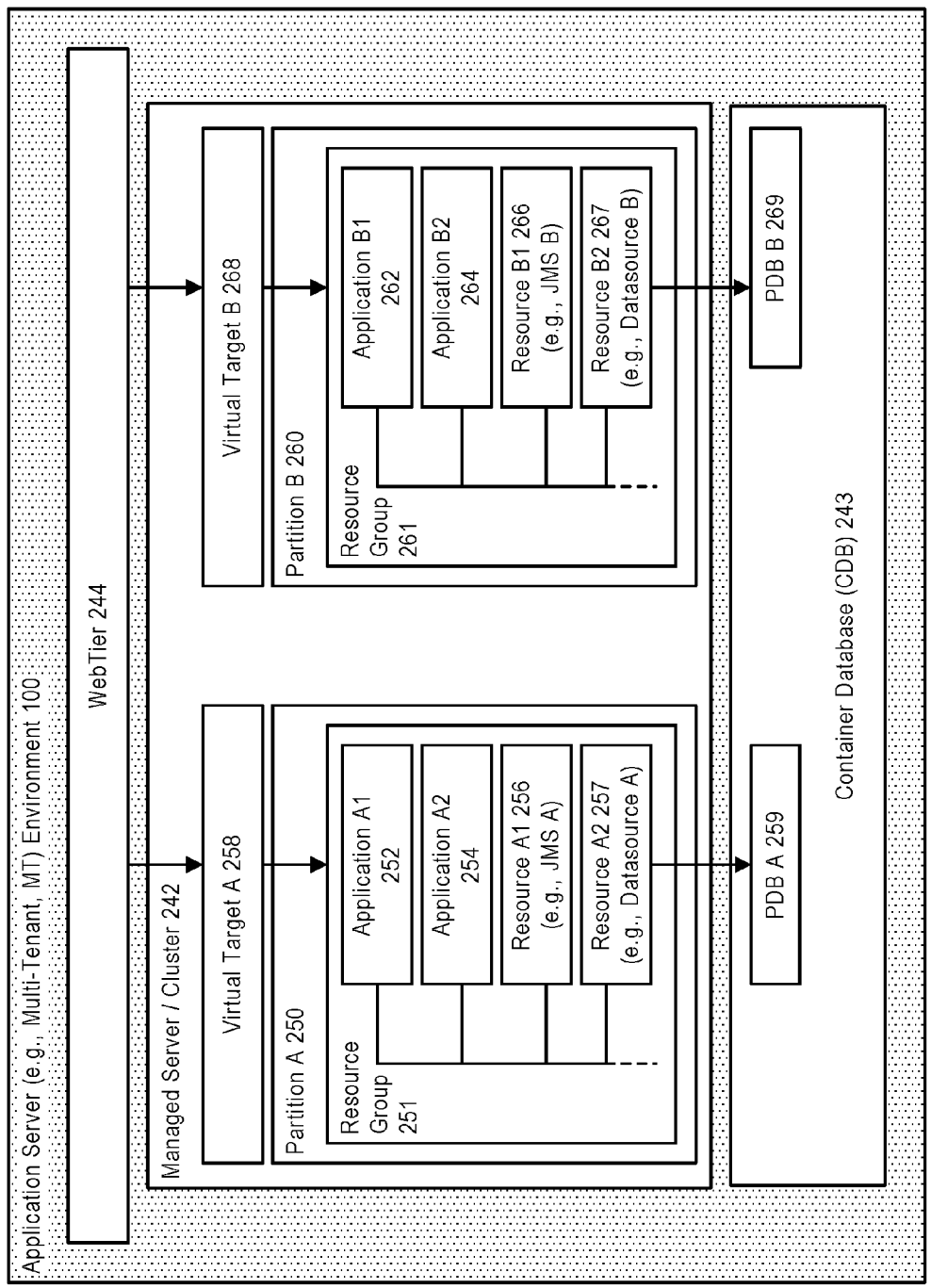
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant—unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant—specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
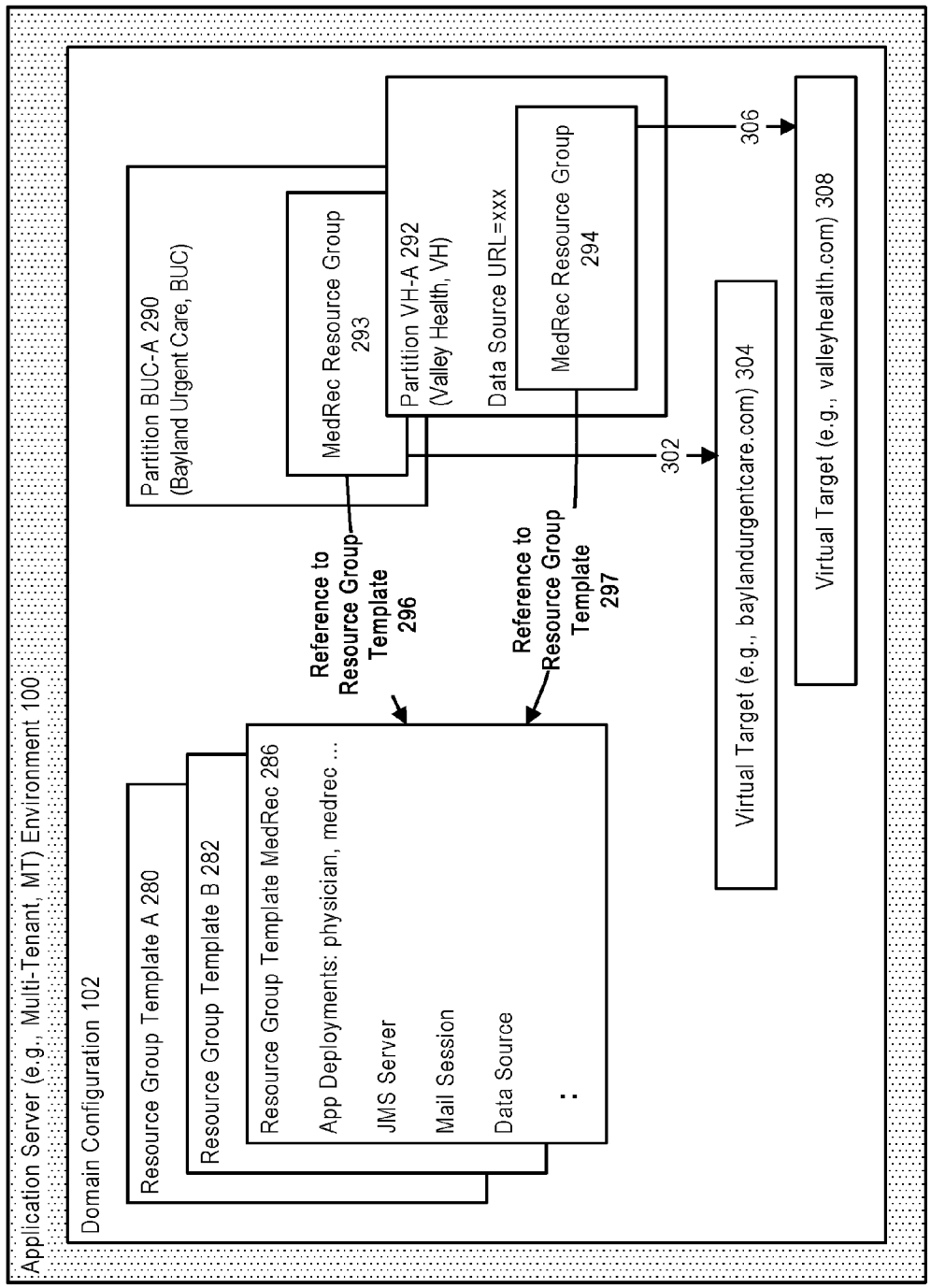
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
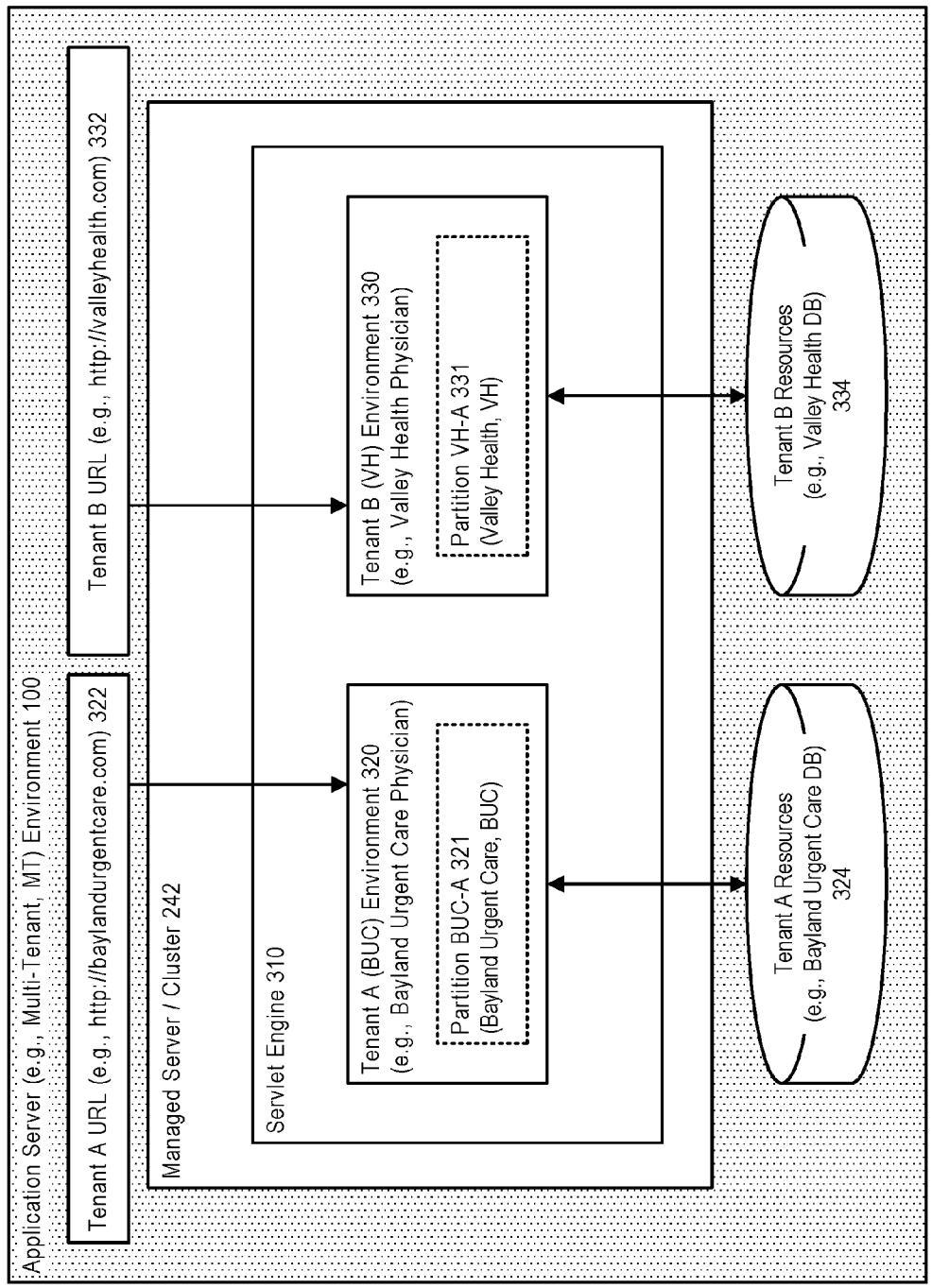
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

Support for Web Services

In a multi-tenant environment, a web service deployed to a partition should generally be fully-contained in the partition for consumption by applications in that partition.

In accordance with an embodiment, described herein is a system and method for supporting web services in a multi-tenant application server environment. The system comprises a domain with a plurality of partitions, wherein each partition can include one or more web services, and a web services inspection language (WSIL) application. A partition-aware managed bean server can include managed beans for generating addresses of web services deployed to each partition, wherein the generated addresses can be retrieved by the WSIL application in that partition for use by clients in accessing the web services. The system can further include a web service security manager that can secure web services in each partition, by attaching security policies to each web service endpoint and enforcing the security policies on requests directed to that web service endpoint.

Figure 6:
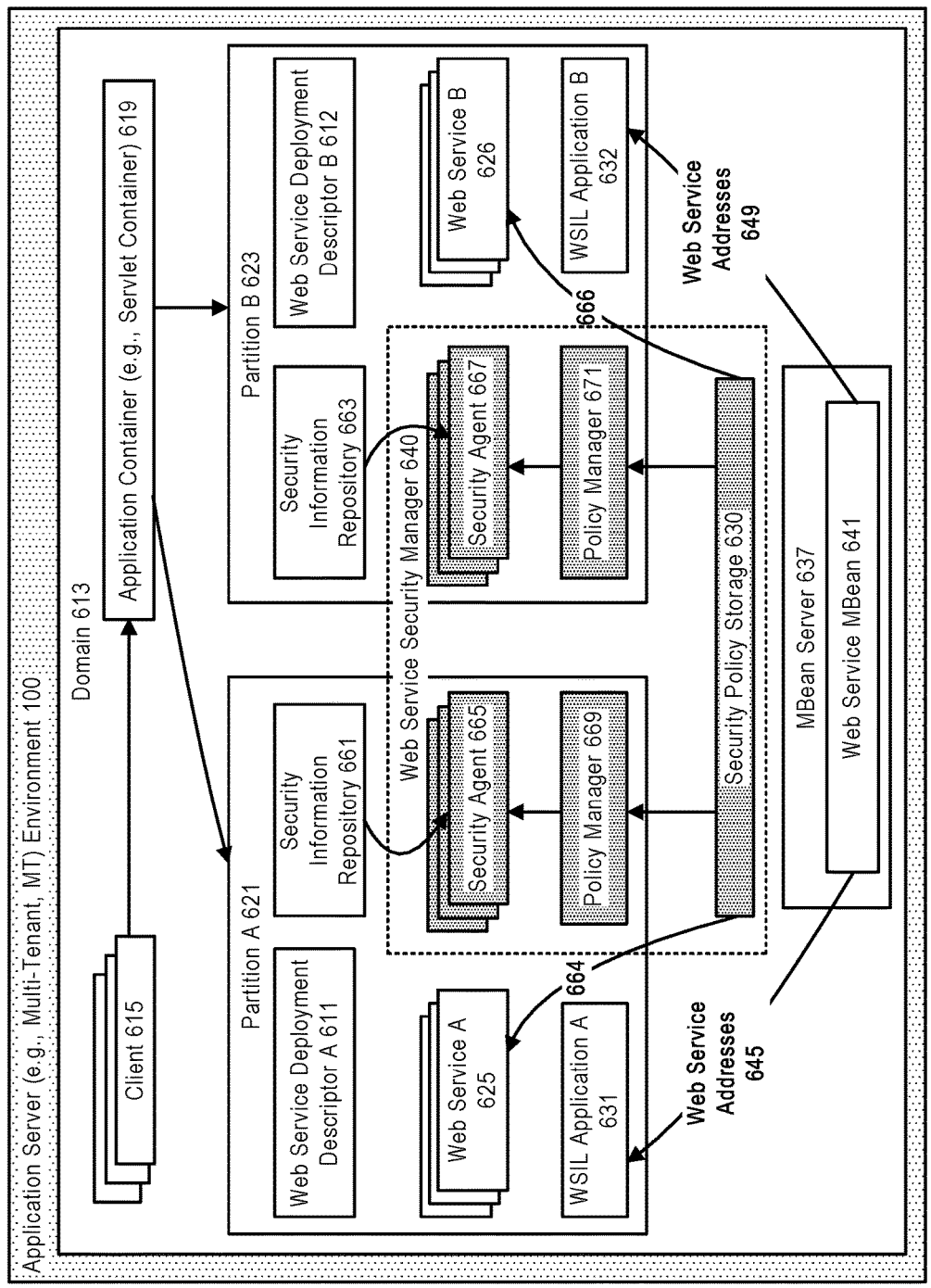
FIG. 6 illustrates a system for supporting web services in an application server, cloud, or other environment, in accordance with an embodiment.

FIG. 6 illustrates a system for supporting web services in an application server, cloud, or other environment, in accordance with an embodiment.

As shown in FIG. 6, a domain 613 in the application server environment can include a plurality of partitions (for example, partition A 621 and partition B 623), each partition comprising one or more web services (for example, web service A 625 or web service B 626) and a web service deployment descriptor (for example, web service deployment descriptor 611, or web service deployment descriptor 612) describing the one or more web services.

As further shown, the system can include a partition-aware managed bean (MBean) server 637 having one or more web service MBean 641. The web service MBean in the MBean server can generate 645, 649 addresses of web services deployed to each partition.

In accordance with an embodiment, each partition can further include a web services inspection language (WSIL) application (for example, WSIL application A 631 or WSIL application B 632). The WSIL application in each partition can be automatically installed when that partition is created; and can connect to the MBean server, and discover and retrieve the addresses of web services deployed to that partition. Such a WSIL application can also be deployed at a domain scope, and connect to the MBean server to discover and retrieve addresses of web services deployed at the domain scope.

In accordance with an embodiment, each of the retrieved addresses can be a web service definition language (WSDL) URL of a web service; and can include a web service endpoint and a context path (for example host/node, port and protocol). The web service addresses can be used by clients (for example, client 615) to access the web services.

In accordance with an embodiment, a web service security manager (for example, Oracle Web Service Manager) 640 can attach 664, 666 security policies stored in a security policy storage (for example, a database) 630, to a web service endpoint, or another policy subject, at a partition-scope. When a policy subject is at a partition scope, policy sets and resource patterns of the policy subject can be relative to the partition.

In accordance with an embodiment, a policy can include one or more policy assertions, each of which can be an assertion on security, reliable messaging, management, or addressing. A security policy can be created and stored in the domain-level security policy storage to be shared by all partitions in the domain. Alternatively, a security policy can be created and be stored in a partition-scoped security policy storage; such a security policy is not shared with other partitions.

For Java Required Files (JRF) web services, which can comprise components that provide common functionality for business applications and application frameworks, such as Oracle Fusion Applications (FA), a policy cache can be provided at a Java virtual machine (JVM) scope, to contain nodes that include policy subjects, current policy sets and policy set change listeners. The nodes can be stored in the cache with their fully qualified policy subject paths as the keys. Each key can uniquely identify a node across the JVM.

Referring back to FIG. 6, the web service security manager can include a plurality of security agents and a policy manager (for example, security managers 669 and 671) for each partition. Each policy manager can be a stateless application that communicates with the domain-scoped security policy storage, or a partition-scoped security policy storage, to retrieve security policies. Each security agent in a partition (for example, security agent 665 or 667) can be instantiated for a partition-scoped policy enforcement point (for example, a policy subject), and can connect to the policy manager in the partition, to download and cache a latest version of security policies retrieved from a security policy storage.

As further shown in FIG. 6, each partition can include a security information storage (for example, security information repository 661 or 663) for storing key stores, credential stores, keys or certificates. The security information in each security information storage can be used to authenticate and authorize requests directed to web services in each partition.

In accordance with an embodiment, each security agent can protect a web service by intercepting a web service request targeted to the web service, checking a partition-scoped security information repository for security information, and applying the cached security policies (for example, decryption, signature verification, authentication and authorization) to the web service request. If the securities policies attached to the web service endpoint and cached at the security agent execute successfully, the web service request can be delivered to the web service. Similarly, when the web service returns a response, the security agent can apply appropriate security policies to the response, and pass the response to the client if the security policies successfully execute.

As an illustrative example, when a request for a web service is received at the domain, an application container (for example, a servlet container) 619 can examine the request URL for a partition identifier, such as partition name; and route the request to an appropriate partition based on the partition identifier. A security agent associated with the target web service can execute security policies attached to the web service; and determine whether to route the request to the web service based on the outcome of the execution.

Figure 7:
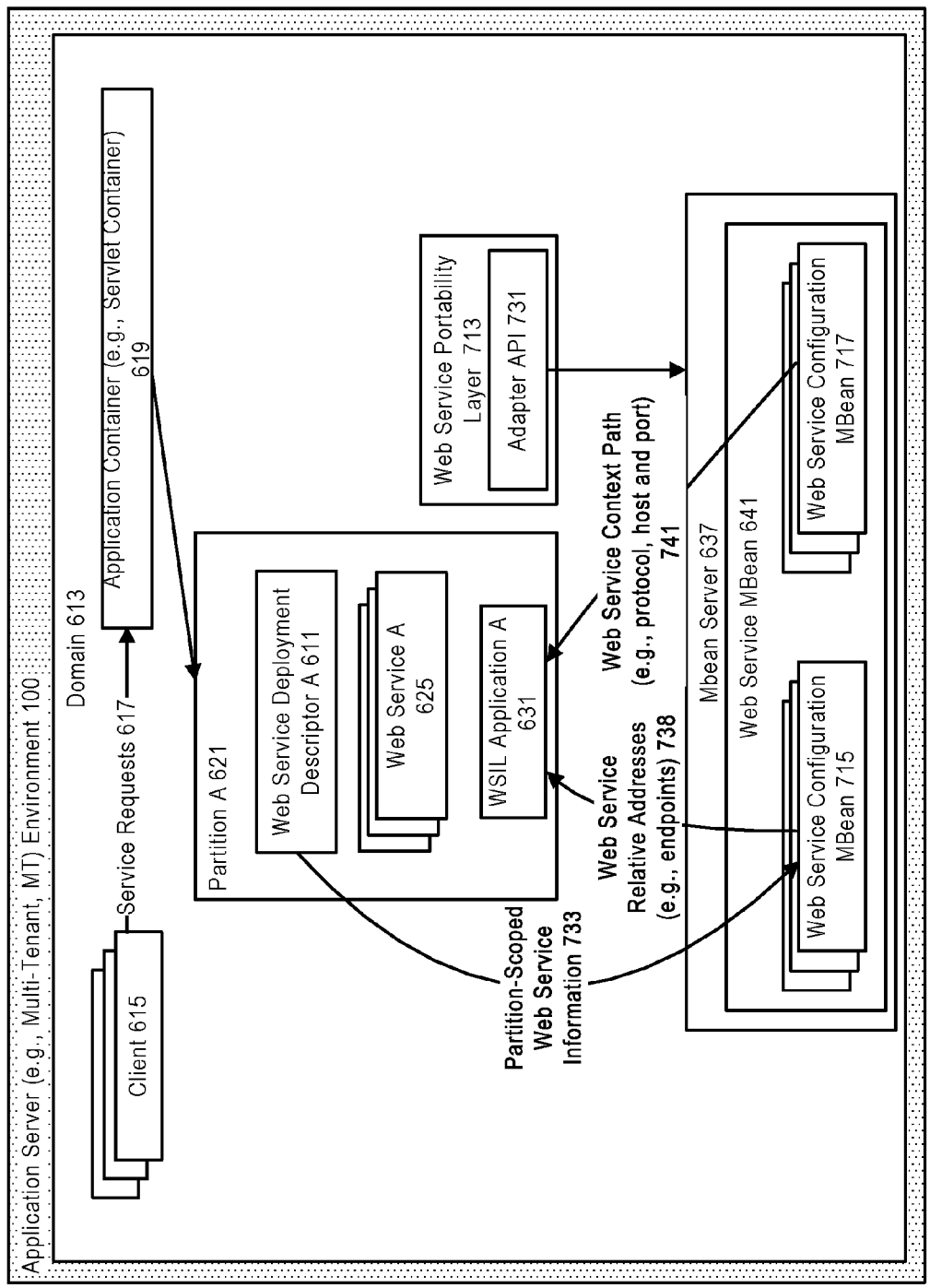
FIG. 7 further illustrates a system for supporting web services in an application server, cloud, or other environment, in accordance with an embodiment.

FIG. 7 further illustrates a system for supporting web services in an application server, cloud, or other environment, in accordance with an embodiment.

As shown in FIG. 7, the web service MBean 641 in the partition-aware MBean server 637 can include one or more web service configuration MBean (for example, web service configuration 715) and one or more web service runtime MBean (for example, web service runtime MBean 717) for each partition, to dynamically generate addresses (e.g., WSDL URLs) of the web services deployed to that partition (for example, partition A). The MBean server can also include one or more domain MBean for use in generating addresses of web services deployed at a domain scope.

In accordance with an embodiment, a partition-scoped MBean can be differentiated from a domain-scoped MBean using a key property, which can be populated with partition information derived from a partition context.

In accordance with an embodiment, partition-scoped web service information 733 derived from the web service deployment descriptor 611 in the partition can be provided to a partition-scoped web service configuration MBean when the web service configuration MBean is created. The web service configuration MBean can generate relative addresses of the web service, and defer the generation of the context path (for example, protocol, host and port) to a partition-scoped web service runtime MBean.

In accordance with an embodiment, an API (for example, oracle.webservices.portability.ManagementAdapter) 713 in a web service portability layer 731 can be provided, to support the dynamic generation of web service addresses.

Listing 1 illustrates a sample list of methods in the API in accordance with an embodiment.

---

Listing 1

--- boolean doesMBeanExist(ObjectNam oname);
MBeanServer getMBeanServer( );
public NounFactoryIntf getNounFactory( );
File getOWSMConfigurationDirectory( );
MBeanServer getPartitionMBeanServer( );

---

As shown in Listing 1, the methods can be used to access partition-scoped MBean, and domain-scoped MBean for use in generating context paths of an appropriate scope for web services.

Referring to FIG. 7, the relative web service addresses and the context paths of the web services can be retrieved 738, 741 by the WSIL application in the partition.

Additional Support for Web Services

In accordance with an embodiment, additional support for web services can be provided based on implementations of the web services.

For example, SOAP/JMS web services can be deployed to a resource group template referenced by a plurality of partitions. JMS queues for the SOAP/JMS services can be configured, so that a JMS queue is associated with one partition. A message-drive bean (MDB) can be dynamically started in each partition to listen on the JMS queue. The URI of the JMS queue can be advertised together with a JNDI URL of the partition in a WSDL, so that a SOAP/JMS web service client can access the partition-specific JMS queue.

In accordance with an embodiment, internal applications provided in a traditional application server environment can be deployed per partition. Attributes of MBean associated with such a partition-level internal application can be made dynamic, so that a change to the configuration of the internal application deployed to a partition does not require a server restart.

For example, an internal application for web service atomic transaction (WS-AT) implementation and the associated configuration can be deployed per partition at server startup. As another example, an internal application for generating a test page for use in testing a web service (for example, testPage application), can also be deployed per partition.

Figure 8:
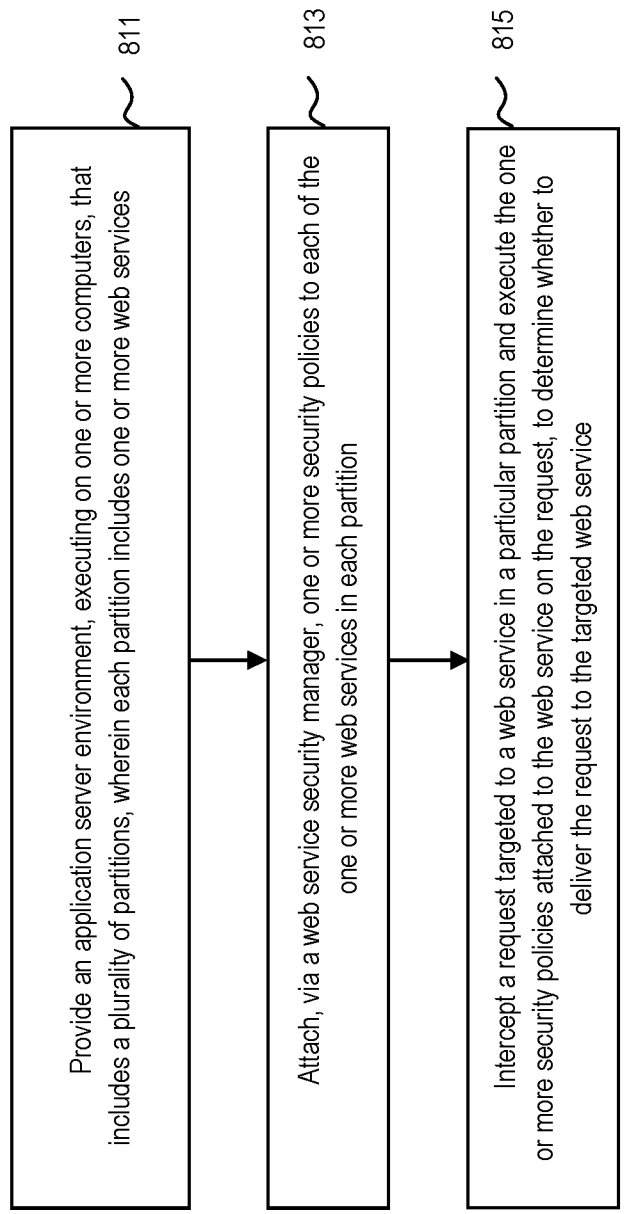
FIG. 8 illustrates a method for supporting web services in an application server, cloud, or other environment, in accordance with an embodiment.

FIG. 8 illustrates a method for supporting web services in an application server, cloud, or other environment, in accordance with an embodiment.

As shown in FIG. 8, at step 811, an application server environment, executing on one or more computers, can be provided, wherein the application server environment includes a plurality of partitions, each partition comprising one or more services.

At step 813, security policies can be attached to the one or more web services in each partition via a web service security manager, wherein the security policies can be stored either in a domain-scoped security policy storage or in a partition-scoped security policy storage.

At step 815, the web service security manager can intercept a request targeted to a web service in a particular partition and execute one or more security policies attached to the web service on the request, to determine whether to deliver the request to the targeted web service.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting web services in a multitenant application server environment, comprising:
a microprocessor;
an application server, executing on the microprocessor, that includes a plurality of partitions, wherein each of the plurality of partitions includes one or more web services, and a web services inspection language (WSIL) application, wherein the WSIL application in said each partition is automatically installed when that partition is created;
a web service security manager that attaches one or more security policies to each of the one or more web services in said each partition;
a managed bean server configured to dynamically generate an address for said each of the one or more web services in said each partition;
wherein the web service security manager operates to
intercept a request targeted to a web service in a particular partition of the plurality of partitions,
execute the one or more security policies attached to the web service,
invoke the WSIL application in the particular partition to retrieve from the managed bean server the address for the web service, and
deliver the request to the web service using the retrieved address for the web service.

2. The system of claim 1, wherein the managed bean server includes one or more partition-aware managed beans of different scopes.

3. The system of claim 1, wherein the managed bean server includes one or more configuration managed beans for generating a relative address for said each of the one or more web services deployed to said each partition, and one or more runtime managed beans for generating a context path for said each of the one or more web services.

4. The system of claim 3, wherein the relative address for said each of the one or more web services is generated using information from a web service deployment descriptor.

5. The system of claim 2, further comprising:
an application programming interface (API) for use in accessing the one or more partition-aware managed beans on the managed bean server.

6. The system of claim 1, further comprising:
one or more internal applications that support web service implementations, where the one or more internal applications are deployed to said each partition.

7. The system of claim 6, wherein the one or more internal applications includes a test page application and a web service atomic transaction application.

8. The system of claim 1, wherein each of the one or more security policies attached to said each of the one or more web services represents an assertion on security, reliable messaging, management, or addressing, and is created and stored in a domain-level security policy storage.

9. The system of claim 8, wherein the web service security manager includes a security agent and a policy manager for said each partition, wherein the policy manager communicates with the domain-level security policy storage to retrieve a plurality of security policies, and wherein the security agent connects to the policy manager to download and cache a latest version of each of the plurality of security policies retrieved from the domain-level security policy storage.

10. The system of claim 9, wherein when the web service returns a response, the web service security manager applies one or more of the plurality of security policies to the response, and passes the response to a client if the one or more security policies successfully execute.

11. A method for supporting web services in a multitenant application server environment, comprising:
providing an application server, executing on a microprocessor, that includes a plurality of partitions, wherein each of the plurality of partitions includes one or more web services, and a web services inspection language (WSIL) application, wherein the WSIL application in said each partition is automatically installed when that partition is created;
configuring a managed bean server to dynamically generate an address for said each of the one or more web services in said each partition;
attaching, via a web service security manager, one or more security policies to said each of the one or more web services in said each partition;
intercepting a request targeted to a web service in a particular partition of the plurality of partitions, and executing the one or more security policies attached to the web service on the request;
invoking the WSIL application in the particular partition to retrieve from the managed bean server the address for the web service; and
delivering the request to the web service using the retrieved address for the web service.

12. The method claim 11, wherein the managed bean server includes one or more partition-aware managed beans of different scopes.

13. The method of claim 11, wherein the managed bean server includes one or more configuration managed beans for generating a relative address for said each of the one or more web services deployed to said each partition, and one or more runtime managed beans for generating a context path for said each of the one or more web services.

14. The method of claim 13, wherein the relative address for said each of the one or more web services is generated using information from a web service deployment descriptor.

15. The method of claim 12, further comprising:
providing an application programming interface (API) for use in accessing the one or more partition-aware managed beans on the managed bean server.

16. The method of claim 11, further comprising:
deploying one or more internal applications that support web service implementations, to said each partition.

17. The method of claim 16, wherein the one or more internal applications includes a test page application and a web service atomic transaction application.

18. A non-transitory computer readable storage medium, including instructions stored thereon which when read and executed by one or more computers cause the one or more computers to perform the steps comprising:
providing an application server, executing on a microprocessor, that includes a plurality of partitions, wherein each of the plurality of partitions includes one or more web services, and a web services inspection language (WSIL) application, wherein the WSIL application in said each partition is automatically installed when that partition is created;
configuring a managed bean server to dynamically generate an address for said each of the one or more web services in said each partition;
attaching, via a web service security manager, one or more security policies to said each of the one or more web services in said each partition;
intercepting a request targeted to a web service in a particular partition of the plurality of partitions, and executing the one or more security policies attached to the web service on the request;
invoking the WSIL application in the particular partition to retrieve from the managed bean server the address for the web service; and
delivering the request to the web service using the retrieved address for the web service.

19. The non-transitory computer readable storage medium of claim 18, wherein the managed bean server includes one or more partition-aware managed beans of different scopes.

20. The non-transitory computer readable storage medium of claim 18, wherein the managed bean server includes one or more configuration managed beans for generating a relative address for said each of the one or more web services deployed to said each partition, the relative address for said each of the one or more web services being generated using information from a web service deployment descriptor.

* * * * *

UNITED STATES PATENT AND TRADEMARK OFFICE
CERTIFICATE OF CORRECTION

PATENT NO. : 10,027,716 B2
APPLICATION NO. : 15/708680
DATED : July 17, 2018
INVENTOR(S) : Watson et al.

It is certified that error appears in the above-identified patent and that said Letters Patent is hereby corrected as shown below:

In the Specification

In Column 10, Line 58, delete "ObjectNam" and insert -- ObjectName --, therefor.

In the Claims

In Column 13, Line 44, in Claim 12, after "method" insert -- of --.

Signed and Sealed this
Ninth Day of April, 2019

Andrei Iancu
*Director of the United States Patent and Trademark Office*